United States Patent [19]

Diberardino

[11] Patent Number: 5,281,672
[45] Date of Patent: Jan. 25, 1994

[54] METHOD OF LOWERING THE REACTION EXOTHERM IN THERMALLY POLYMERIZED ACETYLENE TERMINATED RESINS

[75] Inventor: Thomas Diberardino, Severna Park, Md.

[73] Assignee: The United States of America as represented by the Secretary of the Navy, Washington, D.C.

[21] Appl. No.: 942,912

[22] Filed: Sep. 10, 1992

[51] Int. Cl.$^5$ ............................................. C08F 238/00
[52] U.S. Cl. ................................. 525/275; 525/328.1; 526/285
[58] Field of Search ............................ 525/275, 328.1; 526/285

[56] References Cited

U.S. PATENT DOCUMENTS

| | | | |
|---|---|---|---|
| 4,097,460 | 6/1978 | Jabloner | 525/275 X |
| 4,178,430 | 12/1979 | Bilow | 528/245 |
| 4,268,654 | 5/1981 | Arnold et al. | 526/259 |
| 4,336,362 | 6/1982 | Walton | 526/248 |
| 4,690,962 | 9/1987 | Clark et al. | 524/94 |
| 4,730,032 | 3/1988 | Rossi et al. | 526/285 |

OTHER PUBLICATIONS

Theodore R. Watson, "Journal of Applied Polymer Science", vol. 37, 1989, pp. 1921–1929.
R. Rossi et al., ANTEC '88, pp. 896–899.
R. D. Rossi et al., "Acetylene Functional Precursors for New Intrinsically Conductive Polymers", 18th International SAMPE Technical Conference, Oct. 7–9, 1986, pp. 959–969.
Nan-Loh Yang et al., Polymeric Materials Science & Engineering, Fall Meeting 1986, vol. 35, pp. 481–485.

Primary Examiner—Joseph L. Schofer
Assistant Examiner—Mark Nagumo
Attorney, Agent, or Firm—Charles D. Miller

[57] ABSTRACT

A method for producing acetylide polymers substantially without charring or decomposition comprises heating a mixture comprising an acetylene terminated monomer and a prepolymer of said monomer, resulting in a lower reaction exotherm.

10 Claims, No Drawings

METHOD OF LOWERING THE REACTION EXOTHERM IN THERMALLY POLYMERIZED ACETYLENE TERMINATED RESINS

BACKGROUND OF THE INVENTION

This invention relates to a method of controlling the reaction exotherm in the polymerization of acetylene terminated compounds. More particularly, this invention relates to a method for preventing charring and decomposition during polymerization by heating a mixture of an acetylene terminated monomer and its corresponding prepolymer.

Conjugated aromatic acetylene terminated Schiff's bases can be thermally polymerized into thermosets, as described in U.S. Pat. No. 4,178,430 to Bilow. These polymers are of particular interest because the extended conjugated pi electron system presents the possibility of electrically conducting polymers. The polymers also show the capacity to withstand harsh environmental conditions.

The acetylene end groups polymerize thermally. Heat treatment must be carefully controlled in order to prevent charring, foaming and decomposition. This control is difficult to achieve due to self-heating and poor heat dissipation in the bulk sample. Heating slowly may not guarantee good results, as the heat is internally generated. One previous attempt to solve this problem is described in Walton, Journal of Applied Polymer Science, Vol. 37, pp. 1921-1929 (1989), who partially b-staged the resins,, thereby lowering the recrystallization temperature and allowing curing at lower temperatures. Although this technique slightly improved the window of processability for these polymers, it did not successfully control the reaction exotherm. Until now, good heat dissipation has required limiting the size or thickness of the sample. A method of controlling the reaction exotherm for these polymers is currently greatly needed.

It is therefore an objective of the present invention to provide a method for controlling the reaction exotherm of acetylene terminated monomers.

SUMMARY OF THE INVENTION

In order to achieve the above-stated objective, there is provided a method of producing an acetylide polymer substantially without charring or decomposition, comprising the step of heating a mixture comprising an acetylene terminated monomer and a prepolymer of the monomer.

DETAILED DESCRIPTION

It has been discovered that addition of a prepolymer to the starting monomer being heated can lower the reaction exotherm in the polymerization of acetylene terminated monomers. The prepolymer is formed from the monomer units used as the starting material, and thus the properties of the final polymeric product are not adversely affected by this process. The present invention differs significantly from the b-staging practiced by Walton, supra, because the b-staging involved initially heating only monomer, then only oligomer.

In a preferred embodiment of the present invention, the - acetylene terminated monomer is a Schiff's base resin having a fully conjugated pi electron system. Especially preferred as a starting material is bis-(3-ethynylaniline) N,N'(1,3-dimethylidene benzene), which offers an unusually large window of processability between its melting point and the onset of polymerization. However, the method of the present invention will be useful for any acetylene terminated monomer which is prone to charring, foaming, or decomposition during thermal polymerization. Typically, a monomer having a strongly exothermic polymerization will be prone to self-heating and charring. Phenylquinoxalines are one such group of monomers,, as are other isomers of the preferred starting material bis-(3-ethynylaniline) N,N'(1,3-dimethylidenebenzene).

Acetylene terminated compounds may polymerize by several mechanisms. For example, an oxidative coupling process applied to a monomer of Formula I:

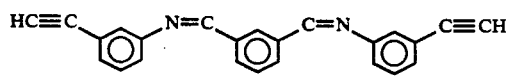

yields a polymeric product of Formula II, which contains a butadiyne group:

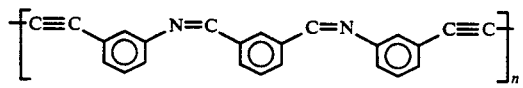

wherein n typically ranges from 2 to about 30. On the other hand, a relatively low temperature thermal polymerization produces a product of Formula III:

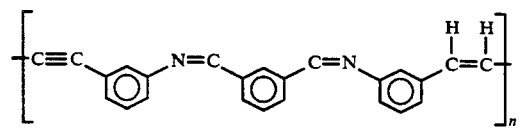

which contains an ene-yne sequence, n being a function of the polymerization conditions.

In a preferred embodiment of the present invention, the prepolymer added to the starting material is the product of an oxidative coupling reaction.

The procedure for making the oxidized prepolymer is well known in the art and is described, f or example, by Yang, Odian, and Wei in Polymeric Materials Science and Engineering, Vol 55, Fall 1986 meeting of the ACS. Oxidative coupling can be performed by bubbling oxygen through a solution of the monomer in pyridine. A preferred oxidative coupling product eventually precipitates out of the pyridine and may be collected conveniently by filtration. Lower molecular weight prepolymer is isolated by evaporation of the solvent.

The amount of prepolymer to be added to the starting material will depend on its particular characteristics. As a lower limit, enough prepolymer must be added to control the exotherm. As an upper limit, the amount of added prepolymer should not be so high that the mixture does not form a single phase when heated. Additionally, adding too much prepolymer may make the melted mixture unmanageably viscous. As an incidental benefit, compression molding of polymers may be facilitated by the present invention's ability to control the viscosity of the melted polymerization mixture. Typically, compression molding requires a starting mixture viscous enough to be contained in a compression mold.

Using the preferred starting material, bis-(3-ethynylaniline) N,N'(1,3-dimethylidenebenzene), it was found that a mixture having an approximately 15% by weight concentration of prepolymer produced an acceptable polymer upon thermal polymerization. Routine skill may be used to vary the starting concentration of prepolymer according to specific needs.

The preferred method of heating employed in the present invention is similar to that used in heating acetylene terminated compounds without the presence of a prepolymer. This method is described by Walton, supra. The polymerization involves an initial cure in which the starting material is heated and held for an hour above its melting point but slightly below the point of significant endothermicity. The temperature is then gradually increased to 300° C. and held for fifty hours. Following this initial cure, conductivity is induced by a standardized heating procedure holding the temperature for one hundred hour periods at temperatures increasing in 100° C. increments until approximately 700° C., at which point conductivity normally has been achieved. The present invention allows a more rapid initial cure, with substantially no charring, foaming, or decomposition. Routine skill may be employed in varying the times and temperatures for curing and for subsequent processing of the polymer.

Evidence for the lower exotherm has been obtained by Differential Scanning Calorimetry (DSC). The heat of polymerization for pure bis-(3-ethynylaniline) N,N' (1,3 dimethylidenebenzene) is 663 J/g and the exotherm maximum occurs at 220° C. The prepolymeric form yields a heat of polymerization of 244 J/g and a maximum at 2000° C. A blend containing 66% by weight bis-(3-ethynylaniline) N,N'(1,3-dimethylidenebenzene) and 34% by weight prepolymer, prepared as in Example 1, yields a heat of reaction of 414 J/g and a maximum at 213° C. The endotherm for the polymer of this blend is absent, probably due to dissolving of the polymer in the melt. The value of 414 J/g is 106 J/g less than the weighted average value, based on the pure components, for this blend.

The exotherm is also lowered by heating to 1500° C. and holding for one hour. This procedure results in an exotherm for the homogenous bis-(3-ethynylaniline) N,N'(1,3-dimethylidenebenzene) of 475 J/g. With 15 % by weight added prepolymerized material, the same treatment yields a reaction exotherm of 370 J/g. These results show that the present invention is compatible with b-staging and the two methods together yield an even lower exotherm than that obtained by either method individually.

The following examples are intended to illustrate the invention, and do not limit the invention in any way.

EXAMPLE 1

Oxidative Coupling

Reaction conditions for oxidative coupling of bis-(3-ethynylaniline) N,N'(1, 3-dimethylidenebenzene) were taken from Yang et al., supra. The reaction was as follows. A catalytic amount of copper(I) chloride (0.024 grams of CuCl in 30 ml. of freshly distilled and dry pyridine) was stirred in pyridine and separated from an insoluble portion. The copper(I) chloride solution was placed in a round bottom flask equipped with a gas inlet and condenser then equilibrated to 40° C. by immersion in a bath. Starting material, bis-(3-ethynylaniline) N,N'(1,3-dimethylidenebenzene) was added and oxygen bubbled through the vigorously stirred solution. The reaction was continued for at least forty eight hours, after which a solid was obtained by reprecipitation from isopropyl alcohol. The crude solid was purified by repeated washing in pyridine and isolation from isopropyl alcohol and then from methanol. The isolated product was dried under reduced pressure at 80° C. for three hours then at 65° C. overnight. Evidence for the formation of the diacetylene group is seen by appearance of two new absorptions in the FTIR spectrum occurring at $2150 \text{ cm}^{-1}$ and $2222 \text{ cm}^{-1}$ attributable to the stretching vibration of the conjugated triple bond.

EXAMPLE 2

Polymerization

This example describes the preparation of an acetylide polymer using the oxidative coupling product described in Example 1. The materials were mixed as solids using a vibrating mill. The mixture contained 15% by weight oxidative coupled polymer. It may be more convenient to first melt the bis-(3-ethynylaniline) N,N'(1,3-dimethylidenebenzene) and add the oxidative coupled product to the melt with mechanical stirring. The product is completely soluble in the starting material and can then be poured directly into the mold. Two molds were made, each approximately 0.8 by 1.6 cm. Then 0.482 g. of bis-(3-ethynylaniline) N,N'(1,3-dimethylidenebenzene) was mixed with 0. 084 g. of the oxidative coupled product and melted in the mold. This was repeated with a sample of 0.684 g. of bis- (3-ethynylaniline) N,N'(1, 3-dimethylidenebenzene) and 0.199 g. of the oxidative product. An equal amount of pure bis-(3-ethynylaniline) N,N'(1,3-dimethylidenebenzene) was melted and heated alongside the blend in a similar mold. The material was melted and held for one hour. The temperature was raised to 150° C/ and held for one hour then slowly raised to 2000° C. Upon reaching approximately 1820C the pure sample foamed and charred resulting in decomposition while the sample containing the oxidative coupled additive was further heated without incident. The material was held at 2000° C. for one hour then removed from the mold and placed in a high temperature furnace equipped with a retort. At this time the sample appeared as a hard, black piece with a smooth surface. The sample was heated at 250° C. for two hours then 300° C. for twenty four hours. The heating sequence, once the sample has formed into a hard casing, can vary according to the use for which the material is being made. Once hardened the material is considered the same as if it were made with pure bis-(3-ethynylaniline) N,N'(1,3-dimethylidenebenzene) and therefore it is treated as described in the literature. The only purpose for the oxidative coupled product is to lower the reaction exotherm resulting in better control, especially when thicker sections are needed. After the 300° C. treatment the oven was evacuated with argon, and heating took place at 400° C. for five hours then at 600° C. for twenty hours.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for producing an acetylide polymer substantially without charring or decomposition, comprising the step of heating a mixture comprising an acetylene terminated monomer and a prepolymer of said monomer, wherein the acetylene terminated monomer is a Schiff's base resin.

2. A method according to claim 1, wherein the proportion of said prepolymer in said mixture is between 5 and 25% by weight.

3. A method according to claim 2, wherein said proportion of prepolymer is about 15% by weight.

4. A method according to claim 1, wherein the acetylene terminated monomer is bis-(3-ethynylaniline) N,N'(1,3-dimethylidene benzene).

5. A method according to claim 4, wherein said heating is effected at about 200° C.

6. A method according to claim 5, wherein said heating further comprises raising the temperature in 100° C. increments until the desired degree of polymerization is achieved.

7. A method according to claim 4, wherein said heating is effected initially at about 150° C. for about one hour, and the temperature is then raised to about 200° C.

8. A method according to claim 7, wherein said heating further comprises raising the temperature in 100° C. increments until the desired degree of polymerization is achieved.

9. A method for producing an acetylide polymer substantially without charring or decomposition, comprising the step of heating a mixture comprising an acetylene terminated monomer and a prepolymer of said monomer, wherein the prepolymer is an oligomer containing between 2 and 30 monomer units and the prepolymer is formed by oxidative coupling of said acetylene terminated monomer.

10. A method according to claim 9, wherein said acetylene terminated monomer is bis-(3-ethynylaniline) N,N'(1,3-dimethylidenebenzene).

* * * * *